United States Patent
Masterson et al.

(10) Patent No.: US 10,433,105 B2
(45) Date of Patent: Oct. 1, 2019

(54) GEOGRAPHICALLY-DRIVEN GROUP COMMUNICATIONS

(71) Applicant: Microsoft Technology Licensing, LLC, Redmond, WA (US)

(72) Inventors: Clark L. Masterson, Sammamish, WA (US); Felix Gerard Torquil Ifor Andrew, Seattle, WA (US); Fernando Henrique Inocêncio Borba Ferreira, Bellevue, WA (US); Joao Celestino Leite Pinheiro De Paiva, Issaquah, WA (US); William David Carr, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/792,366

(22) Filed: Oct. 24, 2017

(65) Prior Publication Data
US 2019/0124466 A1   Apr. 25, 2019

(51) Int. Cl.
| | |
|---|---|
| H04W 4/021 | (2018.01) |
| H04L 12/58 | (2006.01) |
| H04L 12/18 | (2006.01) |
| H04W 4/12 | (2009.01) |
| H04L 29/08 | (2006.01) |

(52) U.S. Cl.
CPC ......... H04W 4/021 (2013.01); H04L 12/1859 (2013.01); H04L 51/14 (2013.01); H04L 51/20 (2013.01); H04L 67/306 (2013.01); H04W 4/12 (2013.01)

(58) Field of Classification Search
CPC ........ H04W 4/021; H04W 4/12; H04L 67/306
USPC ................................. 455/456.1–3, 404.2, 407
See application file for complete search history.

(56) References Cited

U.S. PATENT DOCUMENTS

| | | | |
|---|---|---|---|
| 6,356,838 B1* | 3/2002 | Paul ................... | G01C 21/3453 701/410 |
| 8,131,307 B2* | 3/2012 | Lubeck ................. | H04W 4/029 455/456.2 |
| 2009/0083111 A1* | 3/2009 | Carr ..................... | G06Q 10/047 705/7.13 |

(Continued)

OTHER PUBLICATIONS

"International Search Report and Written Opinion Issued in PCT Application No. PCT/US2018/055761", dated Jan. 22, 2019, 11 pages.

*Primary Examiner* — Congvan Tran
(74) *Attorney, Agent, or Firm* — Newport IP, LLC; Scott Y. Shigeta

(57) ABSTRACT

Technologies are described for generating geographically-driven group communications involve maintaining location information for multiple user devices, data defining geographic regions, and rules that identify a geographical region to which the rules applies and a communication and payload to be sent. When an update in the location information, geographical regions or rules is detected, an evaluation is performed to determine whether a user client device is located in the geographical region identified for the rule. If so, the communication and payload defined in the rule are sent to the user client devices for a group of users located in the geographical region for the rule. In some examples, the rule defines a group characteristic condition and the communication and payload are sent to the user client devices for users that satisfy the group characteristic condition.

20 Claims, 12 Drawing Sheets

(56) References Cited

U.S. PATENT DOCUMENTS

| | | |
|---|---|---|
| 2011/0038287 A1 | 2/2011 | Agarwal et al. |
| 2015/0213497 A1 | 7/2015 | Jain et al. |
| 2016/0189182 A1* | 6/2016 | Sullivan ............ G06Q 30/0204 |
| | | 705/7.33 |
| 2017/0214752 A1 | 7/2017 | Longo et al. |
| 2017/0235756 A1* | 8/2017 | Mehta ................ G06F 11/1461 |
| | | 707/620 |
| 2018/0084380 A1* | 3/2018 | Lucas ................. G06Q 30/014 |
| 2018/0189713 A1* | 7/2018 | Matthiesen ............ H04W 4/80 |

* cited by examiner

GEOGRAPHICALLY-DRIVEN GROUP COMMUNICATIONS

BACKGROUND

Currently, messaging services can be configured to send messages to devices when the devices are located within a geographically defined region. This type of message delivery mechanism is commonly referred to as "geofencing."

The triggering events for such messaging services is generally limited to merely detecting when a single user enters or exits a defined geographic region. These services, therefore, are unable to handle complex criteria for messaging based on location, geography or group characteristics.

It is with respect to these and other considerations that the disclosure made herein is presented.

SUMMARY

The technologies disclosed herein are directed toward generating geographically-driven group communications utilizing location information for user client devices corresponding to users, one or more geographical regions, and one or more rules, where each rule identifies a geographical region to which the rule applies, a group condition that applies to users to which the rule applies, and defines a communication and a payload to be sent when the user client devices of a group of users who match the group condition are located within the geographical region.

The technologies disclosed detect an update event involving a change in a user client device location, user profile data, a geographical region, or a rule and, in response thereto, evaluate whether one or more user client devices are located in the geographical region identified for the rule that have users who meet a group condition identified for the rule. When the user client devices for a group of user who meet the group condition are located in the geographic region, then the communication and payload defined in the rule are sent to the user client devices of the group.

In some examples, the rule defines a form of the communication, such as a text message, a voice message, a Short Message Service ("SMS") message, an email message, or a push notification. Examples of payloads defined for a rule include text data, image data, audio data, haptic data, a Universal Resource Locator ("URL"), or verified document data. Some examples of the payload can be pre-determined content, while other payloads may be algorithmically determined. Geographical regions can be real-world regions or virtual regions.

In other aspects of the technologies disclosed herein, a rule defines a threshold number of user client devices within the geographical region for the one rule, and the communication and payload are sent to the user client devices within the geographical region for the one rule when the number of user client devices within the geographical region meets the threshold number defined by the rule.

In another aspect of the technologies disclosed herein, a rule defines a list of users and, when the user client device for each of the users in the list of users is located within the geographical region for the rule, the communication and payload are sent to the user client devices of the list of users.

In another example of the disclosed technologies, one of the rules identifies a geographical region to which the rule applies, identifies a trigger event relating to the geographical region, and defines a communication and a payload. A processor detects an update event in a first data store relating to user location data and, if the update event matches the trigger event for the rule, sends the communication and payload defined by the one rule to a group of user client devices. Examples of trigger events include a user client device entering the geographical region, a user client device exiting the geographical region, a number of user client devices that have entered the geographical region, a number of user client devices that have exited the geographical region, and a number of user client devices that are currently located in the geographical region. Examples of the group of user client devices to be sent the communication include user client devices for a list of users, user client devices that have entered the geographical region, user client devices that have exited the geographical region, and user client devices that are currently located in the geographical region.

In one aspect of the disclosed technologies, the rule also includes a group characteristic and the processor is in communication with a fourth data store storing user profile data defining one or more user characteristics for the users of the user client devices. The trigger event can include a user client device for a user having a user characteristic matching the group characteristic leaving the geographical region, a user client device for a user having a user characteristic matching the group characteristic entering the geographical region, a number of user client devices with a user having a user characteristic matching the group characteristic that have entered the geographical region, a number of user client devices with a user having a user characteristic matching the group characteristic that have exited the geographical region, a number of user client devices with a user having a user characteristic matching the group characteristic that are currently located in the geographical region. Group characteristics can be based, for example, on being in a list of users, user demographic data, user historical data, user preference data, user location data, and user group identification data.

The rule can also define the group to be sent the communication. Examples of groups to be sent the communication can include user client devices for a list of users, user client devices for users having a user characteristic matching the group characteristic, user client devices for users having a user characteristic matching the group characteristic that have entered the geographical region, user client devices for users having a user characteristic matching the group characteristic that have exited the geographical region, or user client devices for users having a user characteristic matching the group characteristic that are currently located in the geographical region.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a brief introduction to the technologies disclosed herein in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1A:
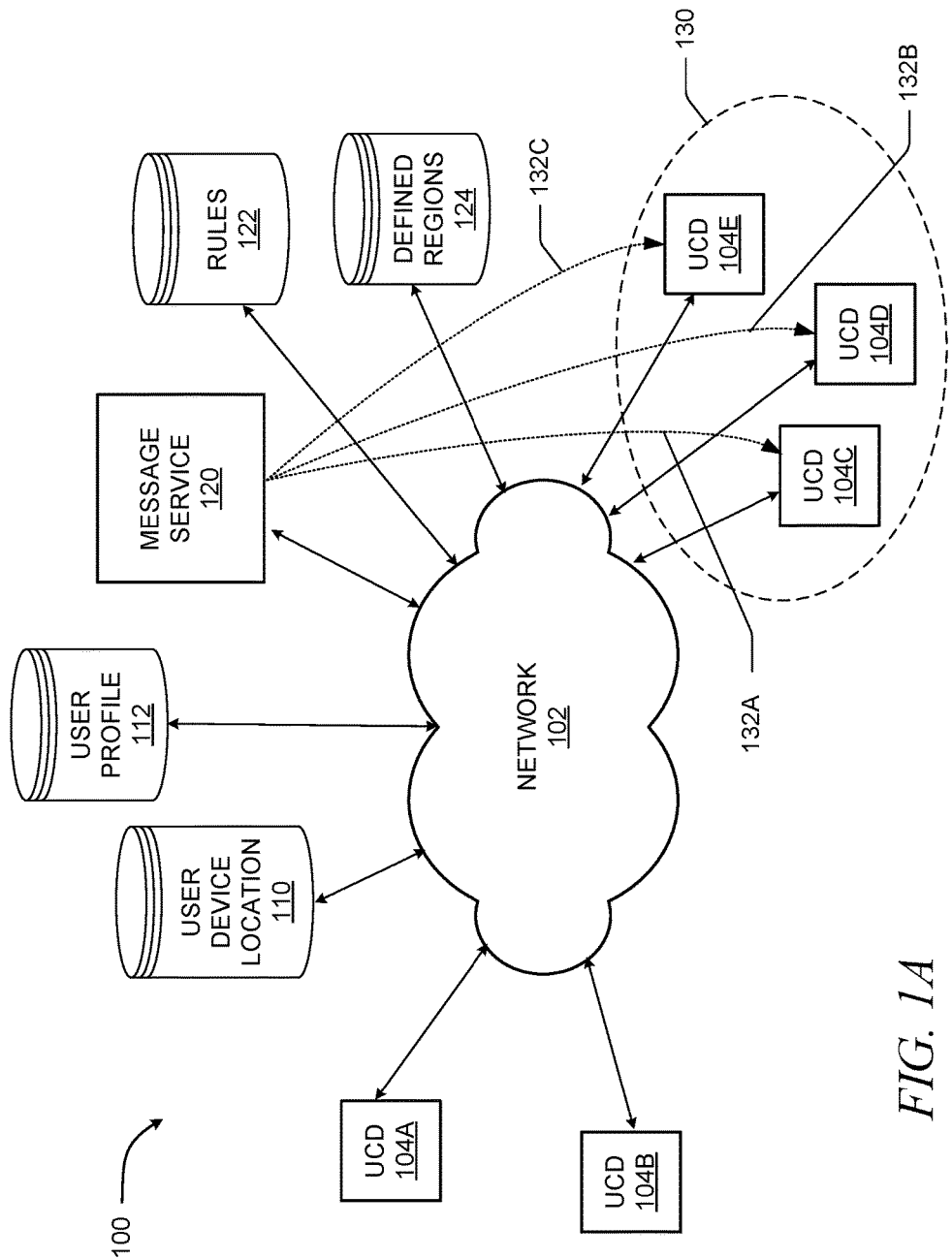
FIG. 1A is a schematic diagram illustrating one example of a network architecture for the technologies disclosed herein.

The following Detailed Description describes technologies enabling geographically-driven group communications. As discussed briefly above, conventional location-based communications are generally limited to detecting when a user device enters a geographic region and sending a message to that user device.

The techniques described below are directed to several approaches to geographically-driven group messaging based on rules that define a geographical region, a group condition, and a communication and payload. When the user devices for a group of users with user characteristics that match the group condition are located within the geographical region, as defined by a rule, the communication and payload are sent to the user devices of the group of users. It is to be appreciated that this is a simplified example, and many factors may be considered in geographically-driven group messaging as will be discussed in greater detail below.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state, movement and/ or any data associated with motion detection. Gestures captured by users of the computing devices can use any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The technologies for generating geographically-driven group communications described herein involve the use of location information for multiple user devices, geographical regions, and rules that identify a geographical region and a group condition to which each rules applies, as well as a communication and payload to be sent. When an update in the location information, user profile data, geographical regions or rules is detected, an evaluation is performed to determine whether user client devices for a group of users who satisfy a group condition identified for a rule are located in a geographical region identified for the rule. If so, the communication and payload defined in the rule are transmitted to the user client devices of the group of users located in the geographical region for the rule.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for geographically-driven group communications will be described. As will be described in more detail below, there are a variety of applications, devices and services that may embody the functionality and techniques described herein.

FIG. 1A is a schematic diagram illustrating one example of a network architecture 100 for the technologies disclosed herein. In this example, multiple user client devices ("UCDs") 104A, 104B, 104C, 104D and 104E are shown that are in communication with message service 120 through network 120.

Message service 120 is also in communication with a user device location data store 110 that stores user location data from UCDs 104. Message service 120 is also in communication with a user profile data store 112 that stores user data for the users of UCDs 104. Message service 120 is in communication with rules data store 122, which stores rules that drive messaging activity of the message service 120, and geographical regions data store 124, which stores data defining the boundaries of geographic regions, such as geographic region 130, that may be the subject of the rules in rules data store 122.

For example, a rule in rules data store 122 defines a communication 132 to be sent to a group of UCDs 104 in geographical region 130 when a group condition for the users of the group of UCDs is satisfied. Message service 120 processes the rule, which causes the message service to determine from data in user device location server 110 that UCDs 104C, 104D and 104E are located in geographical region 130. Message service 120 uses user profile data from user profile store 112 to determine whether the users of UCDs 104C, 104D and 104E have a user characteristic that matches the group condition defined for the rule and, if so, sends communications 132A, 132B and 132C to the UCDs for the group of users. The processing of the rule by message service 120 is described in greater detail below.

Figure 1B:
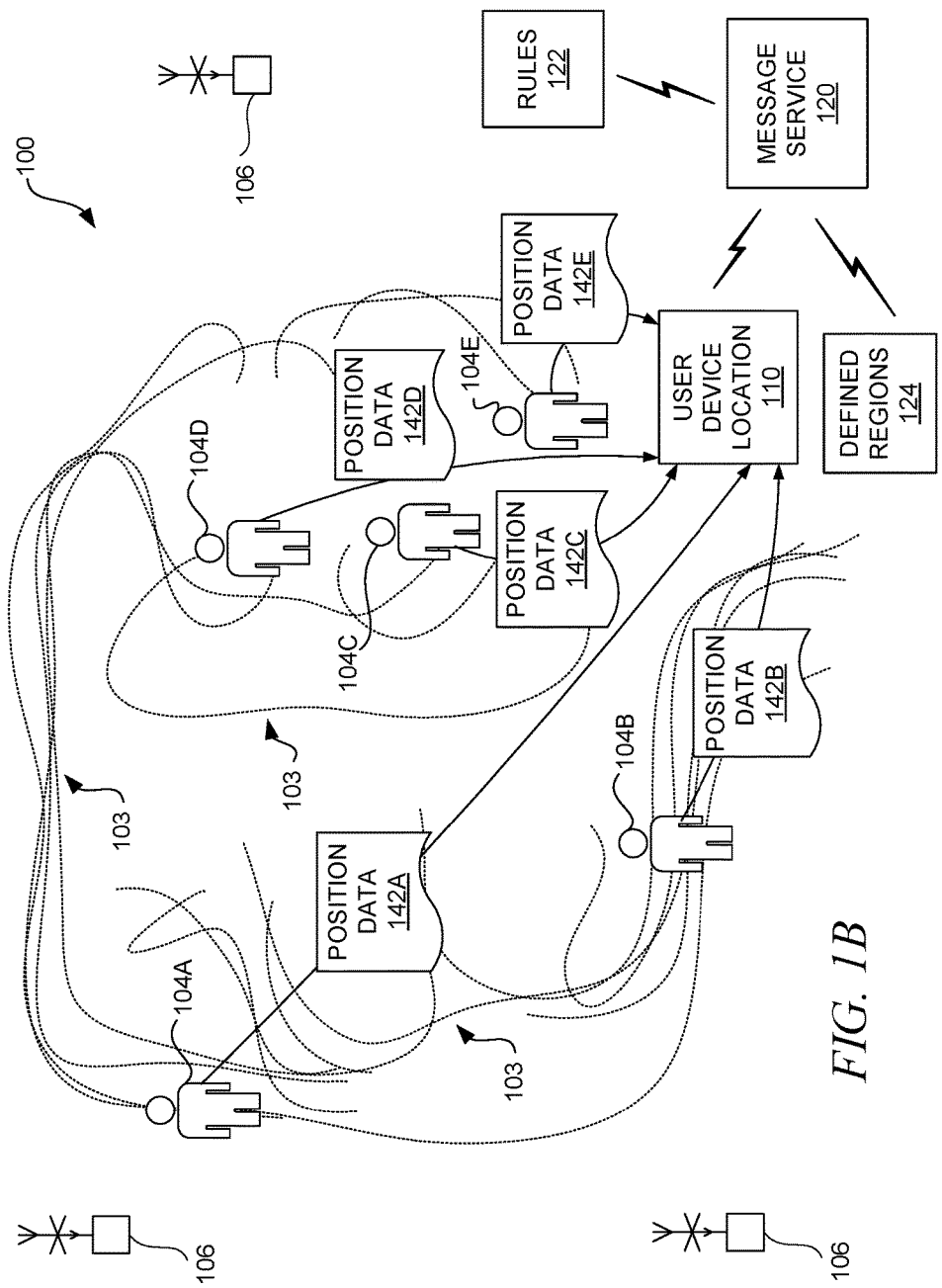
FIG. 1B is a schematic diagram illustrating an example of a scenario, in the architecture of FIG. 1A, where multiple users each have a client device that generates location data associated with movement of the users.

FIG. 1B is a schematic diagram illustrating an example of a scenario in the architecture 100, where multiple users each have a USD 104 that generates position data 142 associated with the movement of users. Position data 142 associated with the movement of users is maintained for each of the multiple users. In some configurations, the user device location data store 110 receives position data 142 from user computing devices 104, such as computing devices 606 illustrated in FIG. 6.

Position data 142 indicating a location of a UCD 104 can be generated by a number of suitable technologies. For instance, position data 142 indicating a location of a UCD 104 can be generated by a mobile computing device or a geographical positioning system ("GPS") device. In another example, one or more WI-FI access points 106 are positioned in various geographical locations and can be used to generate position data 142 that indicates the location of users and/or computing devices within the environment.

Other wired or wireless technologies can be used to enable the messaging system 120 to determine when a person enters or exits a particular geographic region, such as cameras. For example, mounted cameras may be utilized to sense a location of a user in addition to or instead of GPS or WI-FI devices on a user device. In one scenario, cameras that are configured for a geofenced space can perform facial recognition and can trigger a notification or communication payload to users' devices based on the presence of users in the geofenced space. In another example, an augmented reality device, such as a HOLOLENS device from Microsoft Corporation in Redmond, Wash., which utilizes multiple cameras for environment understanding and an infrared camera for depth detection, is capable of mapping the physical surroundings and constructing 3D meshes of the real world which can be useful for determining location. User location data 110 may also reflect a location of a user within a virtual space, such as a building, room or region within a virtual reality ("VR") environment.

In the example of FIG. 1B, position data 142 is obtained from UCDs 104 as users move through a real-world or virtual environment. As illustrated, a first user 101A is associated with position data 142A, user 101B is associated with position data 142B, user 101C is associated with position data 142C, user 101D is associated with position data 142D, and user 101E is associated with position data 142E. The UCDs 104 shown are for purposes of illustration, and position data 142 can be collected for more or fewer users that can be stored by user device location data store 110 and used by the message system 120 to generate communications in accordance with the technologies disclosed.

As a user of a UCD 104 moves through a real-world or virtual environment, locations for the user is obtained. In the examples shown in FIG. 1B, the movements 103 of users are shown as dashed lines that indicate where the users have traveled within the environment. By collecting position data 142 for the UCDs 104, the user device location data store 110 maintains a real-time or near real-time location for each of the multiple UCDs 104 and their associated users.

In some configurations, the position data 142 collected by the user device location data store 110 can be stored in a memory device. The stored position data 142 can indicate the current location of the UCD 104 as well as a user's historical data, such as past locational data, a time of various events, a time of stay at a particular location, as well as a user's direction, ingress, egress, and other activity. The stored position data 142 can be used for a variety of purposes, such as auditing and/or machine learning.

Figure 1C:
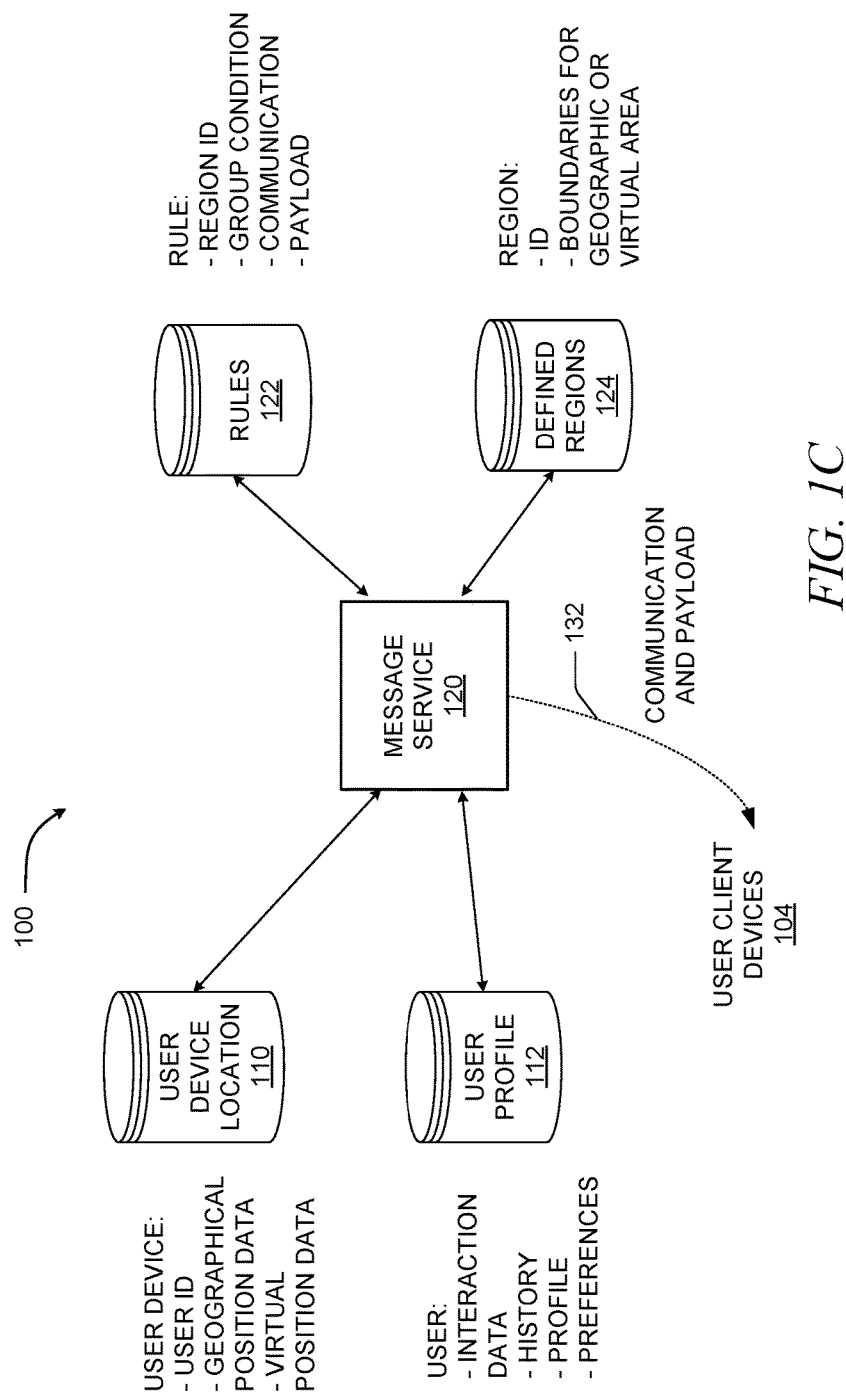
FIG. 1C is a data flow diagram illustrating examples of the data maintained in the network architecture of FIG. 1A in accordance with certain aspects of the disclosed technologies.

FIG. 1C is a data flow diagram illustrating examples of the data maintained in the network architecture 100 in accordance with certain aspects of the disclosed technologies. In this example, user device location data store 110 maintains data for each UCD 104 that includes a user identifier and geographical positioning data indicating a current location of the user. User profile data store 112 maintains data for each user, such as interaction data, historical activity data, user profile data and user preferences. User profile data may include demographic data (e.g. age, gender, etc.) or association data (e.g. first responder, team member, etc.) The data in user profile data store 112 is used in some examples that determine whether a user has a user characteristic that matches a group condition defined in some rules.

Rules data store 122 maintains a definition for each rule that identifies a geographical region and a group condition for the rule as well as defining a communication and payload for the rule. For example, the rule may define a type of message to be sent, such as a text message, email message, or voice message, and the payload may define the content of the message, such as text, image data, audio data, video data, haptic data, universal resource locator ("URL") or verified document data. In some examples, a rule can define a trigger event relating to the geographical region for the rule that triggers the sending of the communication. Some examples can also define a group to receive the communication.

Geographical regions data store 124 maintains a definition for each geographical region that includes a region identifier and defines the boundaries for the region, which may be real-world geographic boundaries, virtual environment boundaries, or both.

In one example, as user device location data store 110 collects position data 142, message service 120 monitors whether a UCD 104 enters or exits a region defined in geographical regions data store 124, such as geographical region 130. When a UCD 104 does enter a geographical region, i.e. the location of the UCD is within the area of the boundaries defined for the geographical region, then message service 120 determines whether one or more rules in rules data store 122 include the geographical region identifier in its definition. If a rule is found that is relevant to the geographical region, then the user profile data for the users of the UCDs 104 in the geographical area can be utilized to determine whether a group of users is located in the geographical region that satisfies the group condition defined in the rule. If it is determined that such a group of users is present, then the message service 120 generates a communication 132 with the payload defined for the rule (e.g. a text message to the UCDs 104 of the group of users indicating that multiple first responders are located in the geographical region).

Note that the payload for a rule can be pre-determined content, such as a set text message, e.g. "The emergency command post is located in the first floor lobby", or a particular audio file, e.g. "Caution—other police officers are in the building." In other examples, at least part of the payload may be algorithmically determined, such as based on current time and the time of an event, e.g. "The show starts in 15 minutes", or based on user data, e.g. "Ten Film Club members are present". An example of a payload that combines predetermined content, algorithmically determined content, and a verified document is one based on sending an electronic ticket to each member of a defined group of users along with the message "Five tickets for your group have been scanned." In another example, a rule may define a payload containing a free museum pass for a group of student users under the age of twelve who enter a geographic region corresponding to a museum.

Figure 2A:
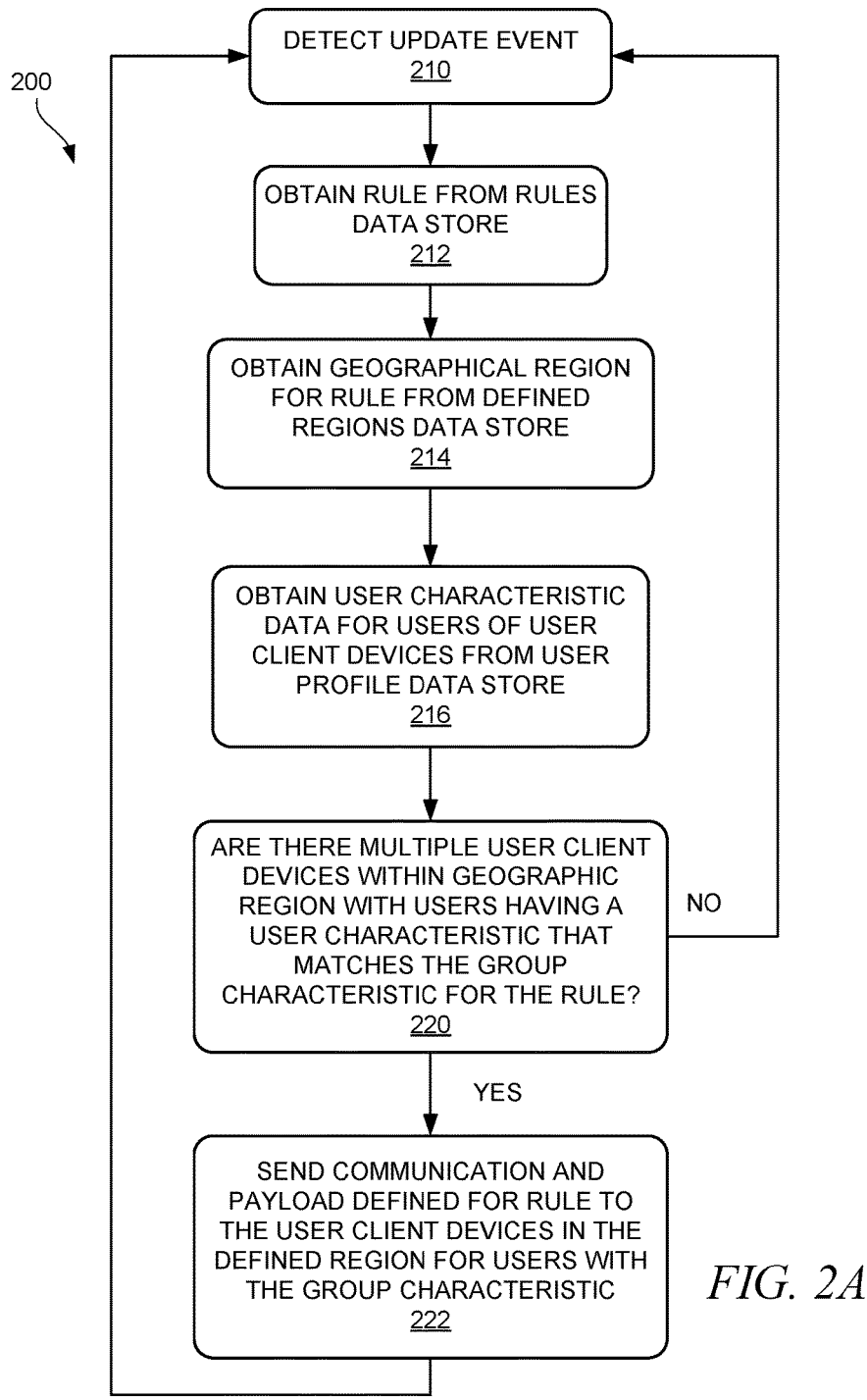
FIG. 2A is a control flow diagram illustrating one example of a message service process operating in accordance with the disclosed technologies.

FIG. 2A is a control flow diagram illustrating one example of a message service process 200 in accordance with the disclosed technologies. At 210, an update event is detected, which may take on a variety of forms. For example, the update event may be updated location data for a UCD 104 in user device location data store 110, new or modified user profile data in data store 112, a new or modified rule in rules data store 122, or a modification of the boundaries of a geographical region in geographical regions data store 124.

In process 200, when an update event is detected at 210, control flows to 212 to obtain one or more rules from rules data store 122 and, at 214, the boundaries for the geographical region for each rule are obtained from geographical regions data store 124. At 216, user profile data for users of the UCDs 104 is obtained from data store 112.

At 220, a determination is made as to whether the UCDs 104 for a group of users are within the geographical region associated with a rule where the users have a user characteristic in their user profile data that matches the group characteristic defined for the rule. If the UCDs 104 for such a group of users are not located within a geographical region for the rule, then control flow returns to 210 to monitor for another update event.

If the UCDs 104 for such a group are located within a geographical region for the rule, then, at 222, the process 200 generates a communication with the payload defined by the rule and sends the communication to the UCDs 104 for the group with the group characteristic defined for the rule. Note that operation 222 of the process or some of the rules themselves can be configured such that the communication and payload defined by the rule are only sent once to the UCD 104 for each user in the group of users.

One example scenario is an email message sent to each UCD 104 of a group of users who are film club members that enters a geographical region that includes a verified document, such as an electronic ticket, pass, credit or coupon, for the user of the UCD 104.

In another example scenario, a rule specifies a geographical region corresponding to a building and a condition for users with a user characteristic that identifies them as a first responder. The messaging service detects when multiple first responders are in the building and sends the communication defined for the rule, such as a text message with text directing the first responders to an emergency meeting point for the building.

In still another example scenario, a rule defined in rules data store 122 identifies a geographical region for a stadium and a condition for users identified in user data as members of a visiting team. When the messaging service 120 detects that the UCDs 104 for a team have entered the geographical region near the stadium, it sends an email to the UCDs 104 with a verified document, such as a pass that can be scanned and verified, permitting the team members to enter the stadium. In another scenario, a rule may be defined for a geographical region pertaining to a convention hall that sends a communication to the UCDs for a group of users when user profile data for the group of users indicates that multiple users have graduated in the same graduating class from the same school.

In an example demonstrating a negative group condition, a rule defined in the rule data store 122 identifies a geographical region for a facility and a condition for a user identified from user data as not being on a list of previously cleared individuals for the facility. When the messaging service 120 detects that the UCD 104 has entered the geographical region and determines from user data for the user of the UCD that the user is not on a list of previously cleared individuals, then a "Please see the front desk" message may be sent to the UCD.

Figure 2B:
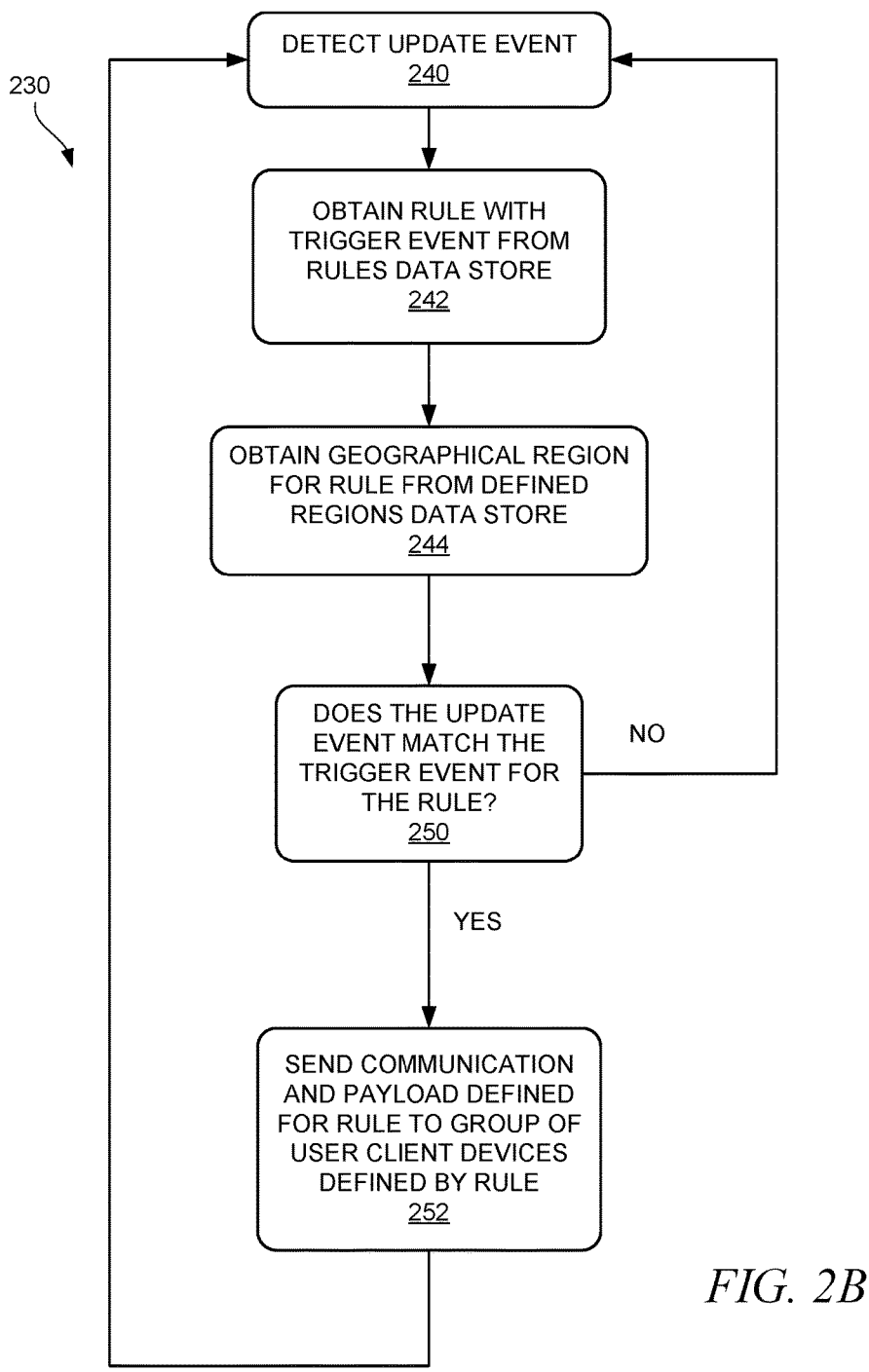
FIG. 2B is a control flow diagram illustrating another example of a message service process operating in accordance with the disclosed technologies where a rule defines a trigger event relating to a geographical region.

FIG. 2B is a control flow diagram illustrating another example of a message service process 230 in accordance with the disclosed technologies involving trigger events relating to geographic regions, such as UCDs 104 entering or exiting a geographical region. In this example, at least one rule in rules data store 122 defines a trigger event relating to the geographic region for the rule. Examples of trigger events include a user client device 104 entering the geographical region, a user client device exiting the geographical region, a number of user client devices that have entered the geographical region, a number of user client devices that have exited the geographical region, and a number of user client devices that are currently located in the geographical region.

At 240, messaging service 120 detects an update event relating to user location data 110 and, at 244, obtains the boundaries for the geographical region for the rule from defined regions data store 124. At 250, if the update event matches the trigger event and the geographical region identified for the rule, e.g. UCD 104 has entered the geographical region for the rule, then, at 252, messaging service 120 sends the communication and payload defined by the rule to a group of user client devices.

In some examples, the group of UCDs 104 may be based on the UCDs located in the geographical region, such as the UCDs in the geographical region with users having the group condition. In other examples, the group of UCDs may be defined by the rule. For example, the group of user client devices may be defined to be the user client devices for a specified list of users, the user client devices that have entered the geographical region, the user client devices that have exited the geographical region, or the user client devices that are currently located in the geographical region.

Figure 3A:
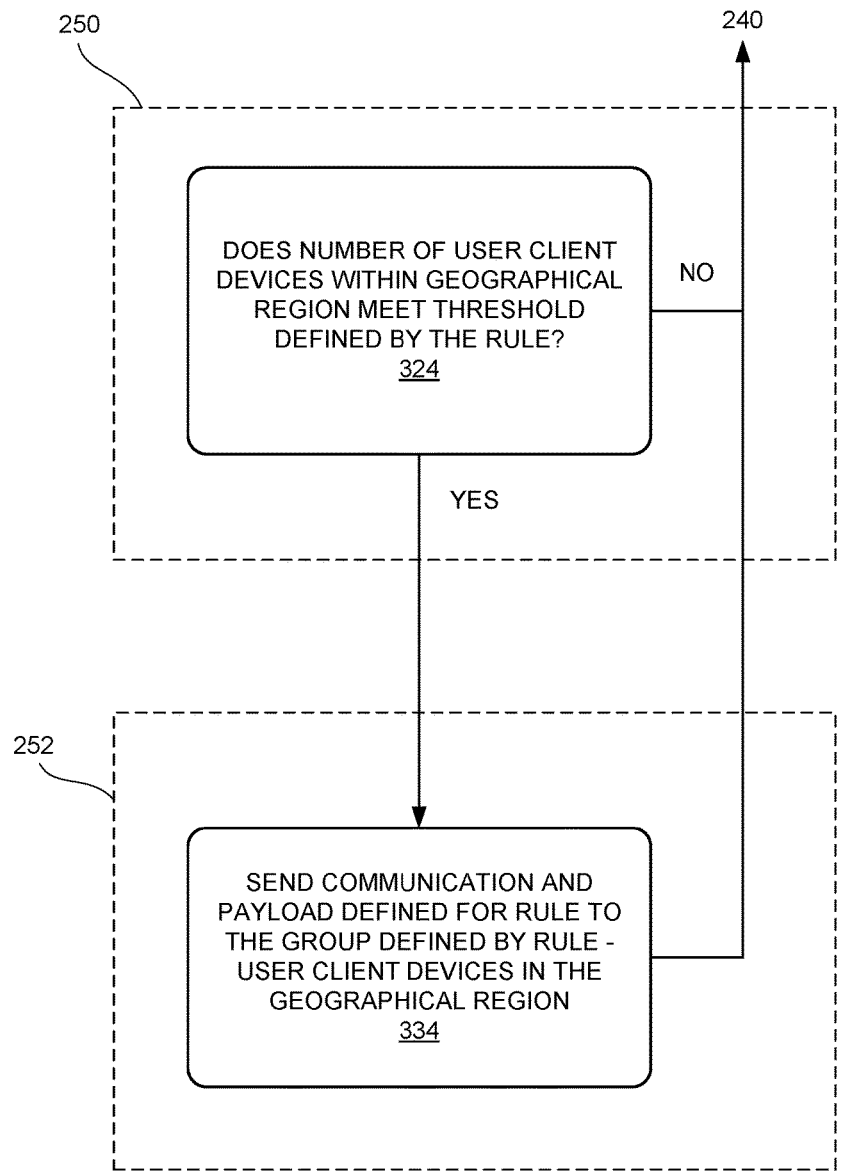
FIG. 3A is a control flow diagram illustrating an example of the process shown in FIG. 2B that determines whether the number of user client devices in a geographical region meets a threshold number defined for a rule before sending a communication.

The trigger events of the disclosed technologies are highly flexible and can be configured to support a variety of messaging scenarios, including scenarios based on a threshold number of users of the UCDs 104 within a geographic region defined by a rule. For example, the rule may define trigger event based on a threshold number of UCDs 104 within the geographical region identified for the rule that must be reached before the communication is sent. In an example scenario pertaining to process 230, FIG. 3A illustrates an example where the trigger event defined for a rule is whether the number of UCDs within the geographical rule defined for the rule meets a threshold number. At 324, a determination is made as to whether the number of UCDs in the geographical region meets the threshold, e.g. the trigger event, and, if it does, then, at 334, the communication and payload defined for the rule are sent to the group defined for the rule, which, in this example, is the group of UCDs located in the geographical region defined by the rule. For example, when the number of users in the geographical region reaches twenty, a text message is sent to the UCDs for all the users in the geographical region.

Figure 2C:
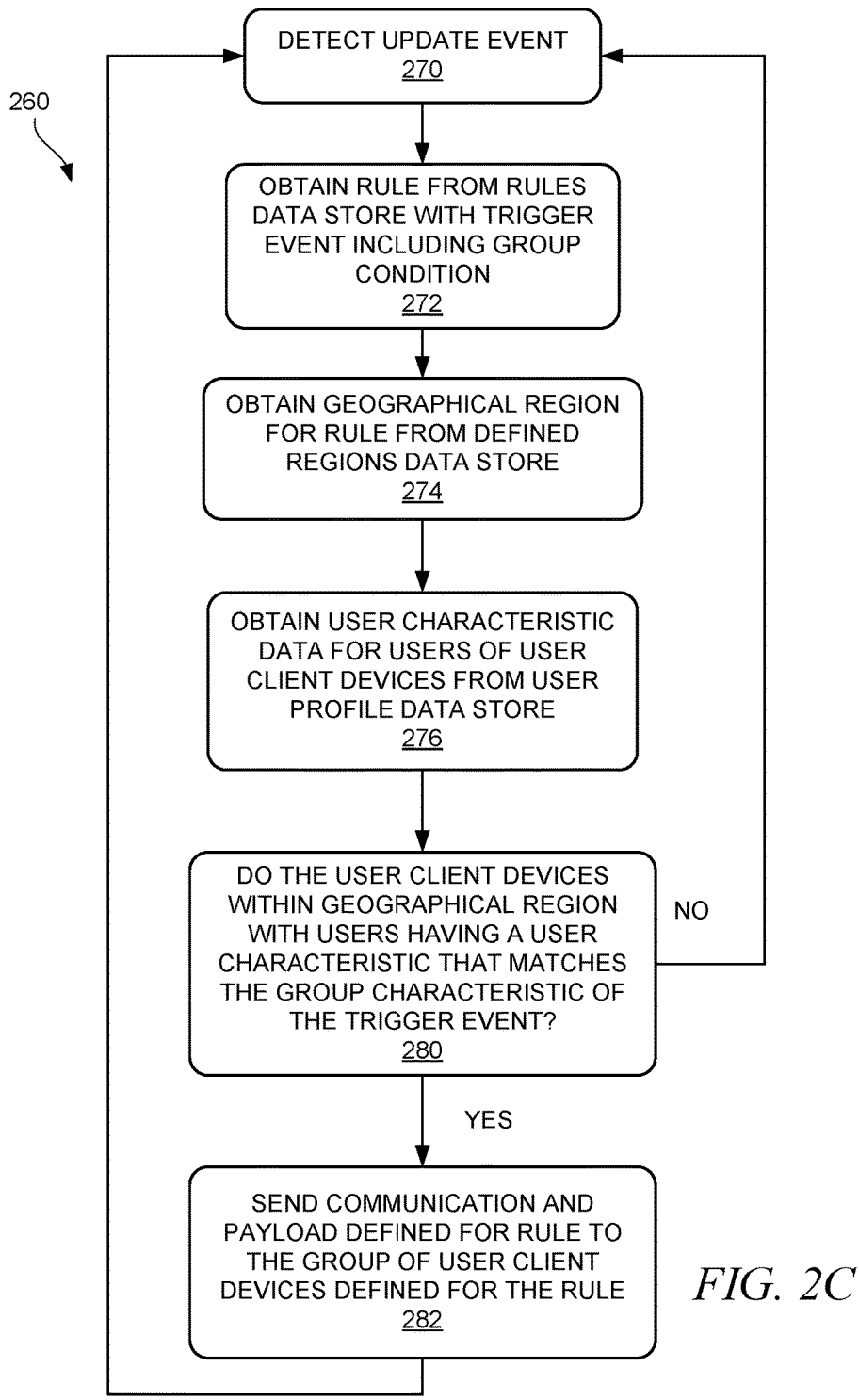
FIG. 2C is a control flow diagram illustrating another example of a message service process operating in accordance with the disclosed technologies where a rule defines a trigger event relating to a geographical region that includes a group condition.

FIG. 2C is a control flow diagram illustrating yet another example of a message service process 260 in accordance with the disclosed technologies involving trigger events relating to geographic regions and a group characteristic. One example of a group characteristic identified in the rule is the user being in a list of users and the defined trigger event is when the user client devices for the list of users are located in the geographical area.

Other examples of group characteristics can be based on user demographic data, user historical data, user preference data, user location data, or user group identification data. Examples of trigger events based on these group characteristics include: a user client device for a user having a user characteristic matching the group characteristic exiting or entering the geographical region; a number of user client devices for users having a user characteristic matching the group characteristic that have entered or exited the geographical region; or a number of user client devices for users having a user characteristic matching the group characteristic that are currently located in the geographical region.

In process 260, the messaging service 120 is in communication with user profile data store 112 storing user profile data defining user characteristics for the users of the user client devices. At 270, messaging service 120 detects an update event, such as change in location of a user client device. At 272, a rule is obtained from rules data store 122 that has a trigger event the includes a group condition. At 274, the boundaries for the geographical region identified for the rule is obtained from defined regions data store 124. At 276, the user characteristic data for the users of the UCDs, such as users of the UCDs located in the geographical region or exiting the geographical region.

At 280, a determination is made as to whether the UCDs within the geographical region for the rule (or UCDs having exited from the geographical region) have users with a user characteristic that matches the group characteristic defined in the trigger event. If so, then, at 282, messaging service 120 sends the communication and payload defined for the rule to the group of UCDs defined for the rule. Examples of defined groups to be sent the communication include: user client devices within the geographical area the rule for users in a list of users; users having the user characteristic matching the group characteristic; users having the user characteristic matching the group characteristic that have entered the geographical region; users having the user characteristic matching the group characteristic that have exited the geographical region; or users having the user characteristic matching the group characteristic that are currently located in the geographical region.

Figure 3B:
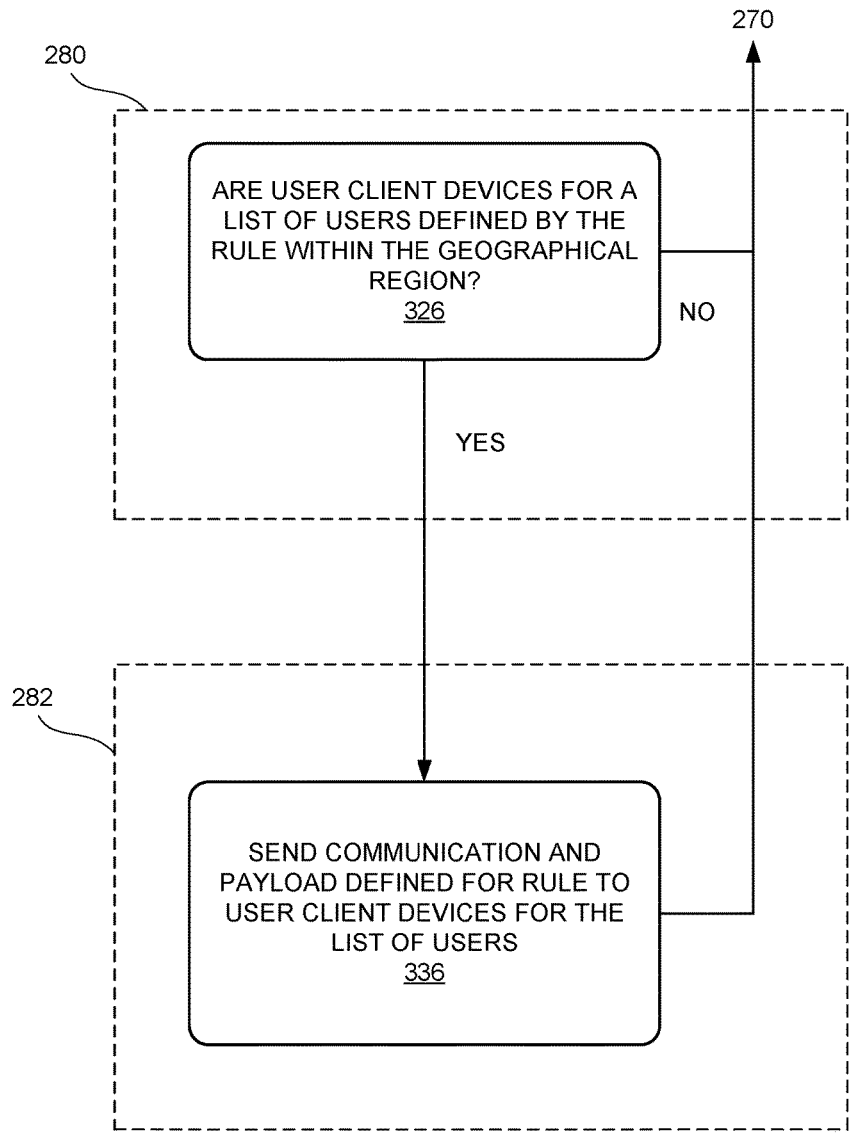
FIG. 3B is a control flow diagram illustrating an example of the process shown in FIG. 2C that involves user client devices for a list of users defined by a rule being present within a geographical region for the rule.

FIG. 3B illustrates one example scenario for process 260 that involves a rule with a group condition that is a defined list of specific users to be present in a geographical region and the group to be sent the communication for the rule is the list of users. At 280 of process 260, messaging service 120 determines whether the UCDs 104 for each of the users list of users defined by a rule is present within the geographical region for the rule. If so, then, at 336, the communication defined for the rule is sent to the UCDs 104 for all of the users in the list of users.

In one example scenario, a rule defines a list of four users and the geographical region pertains to a theater. When the UCDs 104 for the four users of the group are in the area of the theater, then the trigger event is satisfied and messaging service 120 sends an electronic ticket, i.e. verified documents, to each of the four user of the group that can be scanned and verified. In another example scenario, a rule defines another group of six users and the geographical region pertains to a waiting area. When the UCDs 104 for the six users of this group are in the area of the waiting area, then messaging service 120 sends a text message to the UCDs 104 notifying the users in the group that they are all present in the waiting area.

Figure 4:
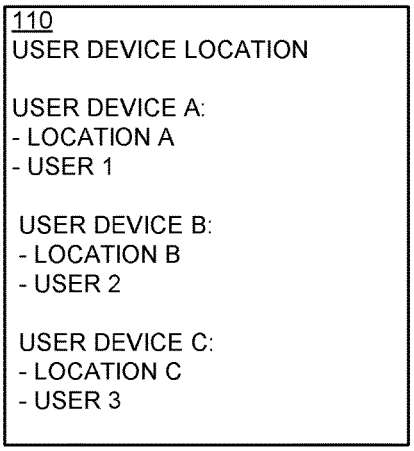
FIG. 4 is a data architecture diagram showing aspects of the implementation of several data stores utilized by the disclosed technologies in one particular implementation.
Figure 4:
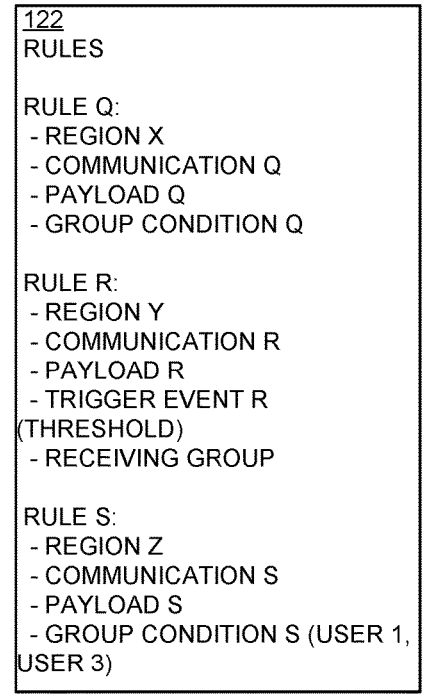
Figure 4:
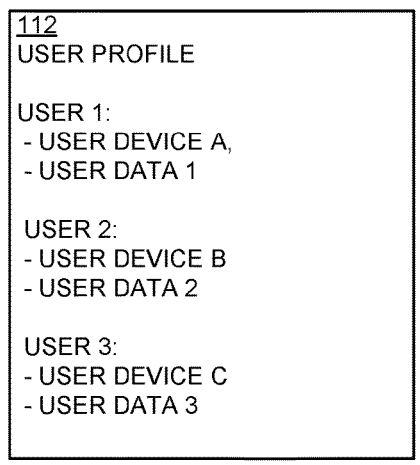
Figure 4:
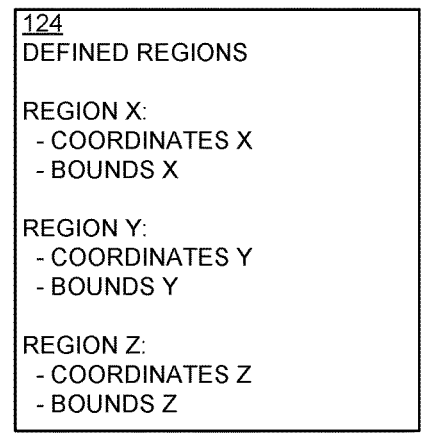

FIG. 4 is an example of a data architecture for the disclosed technologies. In this example, user device location data store 110 includes entries, or fields, for each of three UCDs 104. One entry is for UCD A, which has a current Location A and is associated with User 1. Another entry is for UCD B, which has a current Location B and is associated with User 2. An entry for UCD C indicates that it has a current Location C and is associated with User 3.

Illustrative user profile data store 112 contains entries with user characteristic data for each of three users. The entry for User 1 indicates that the user is associated with User Device A and includes User Data 1, which includes user characteristic data for User 1. Likewise, the entry for User 2 indicates that the user is associated with User Device B and includes User Data 2 and the entry for User 3 indicates that the user is associated with User Device C and includes User Data 3.

Rules data store 122 in the example of FIG. 4 includes entries for Rules Q, R and S. The entry for Rule Q indicates that it pertains to Geographical Region X, defines Communication Q with Payload Q, and includes Group Condition Q, which defines one or more user characteristics for the group of users to which the rule applies. The entry for Rule R indicates that it pertains to Geographical Region Y, defines Communication R with Payload R, and also includes Trigger Event R, which includes a threshold number of users in Geographical Region Y. Rule R also defines a receiving group for the communication, e.g. all users within Geographical Region Y. The entry for Rule S indicates that it pertains to Geographical Region Z, defines Communication S with Payload S, and includes Group Condition S, which includes a list of users consisting of User 1 and User 3.

Geographical regions data store 124 in the example of FIG. 4 includes entries for Regions X, Y and Z. Region X is defined with Coordinates X and Bounds X, Region Y is defined with Coordinates Y and Bounds Y, and Region Z is defined with Coordinates Z and Bounds Z. The coordinates and bounds can be real-world geographic indicators, such as GPS coordinates and boundaries, but may also pertain to virtual environments, such as a location or room in a three-dimensional virtual environment of a game. In some examples, such as particular augmented reality applications, the coordinates and bounds can include both real-world geographic indicators and virtual environments, e.g. a group of users participating in an augmented reality game.

The user location data in user device location store 110 may be obtained by collecting user positioning data, such as position data 142 in FIG. 1B. User characteristic data in user profile data store 112 may come from a wide variety of sources, such as data the user has provided (e.g. user demographic and preference data), sources of historical data (e.g. previous movements, previous purchases), and sources of group identification (e.g. public safety departments, alumni associations, museum or club memberships). One of ordinary skill in the art will appreciate that a wide variety of data sources may be utilized without departing from the scope of the technologies disclosed.

The rules in rules data store 122 and regions in geographical regions data store 124 may be defined in a variety of ways. For example, a user interface or a network services Application Programming Interface ("API") may be provided that permits an administrator or other user to define the rules and geographic regions in the data stores. For example, a building administrator may define a geographic region for a building, a group condition of users who are first responders, and define an audio message to be sent to a group of first responders who enter the geographic region defined for the building. In another example, an organizer may define a geographic region for a theater or stadium, define a list of users, and define a communication that includes electronic tickets to be sent to the group of users as they arrive at the theater or stadium.

One of ordinary skill in the art will recognize that a wide variety of approaches may be utilized and combined with the present approach involving geographically-driven group communications. The specific examples of different aspects of the messaging techniques described herein are illustrative and are not intended to limit the scope of the techniques shown.

Figure 6:
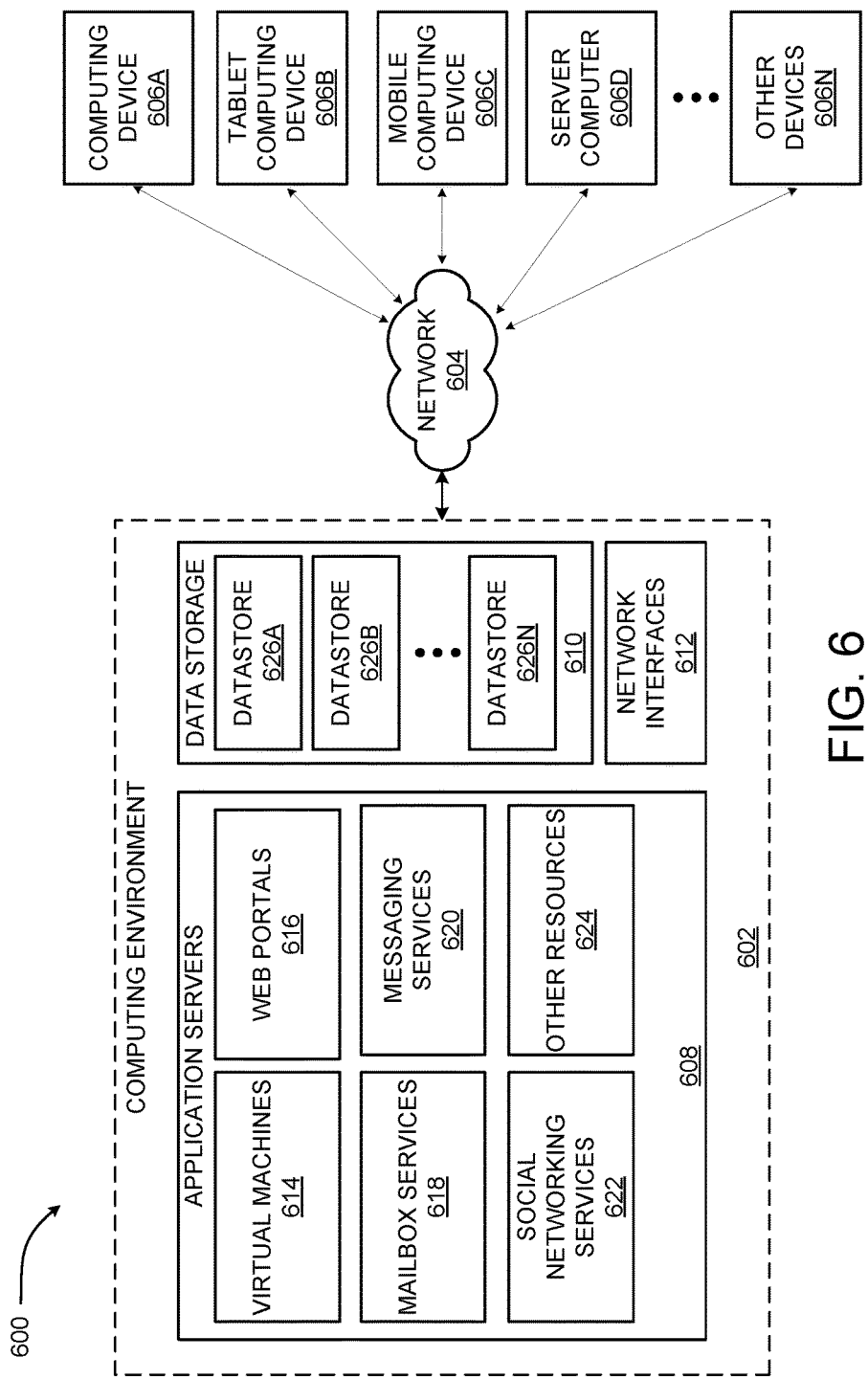
FIG. 6 is a diagram illustrating a distributed computing environment capable of implementing aspects of the techniques and technologies presented herein.

Note that at least parts of the processes and variations described above may be implemented in a server, such as computer environment 602 in FIG. 6, or the "cloud" (e.g. remote computer resources), and data defining the results of the user controls signals translated or interpreted as discussed herein may be communicated to a user device for display. In still other examples, some operations may be implemented in one set of computing resources, such as servers, and other operations may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES, the operations of the processes or routines are described herein as being implemented, at least in part, by an application, component, and/or circuit. Although the following illustration refers to the components of FIGS. 1A-C, 5, 6 and 7, it can be appreciated that the operations of the routines may also be implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library ("DLL"), a statically linked library, functionality produced by a local or network services API, a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of FIGS. 1A-C, 5, 6 and 7, it can be appreciated that the operations of the processes shown in FIGS. 2 and 3A-C may be also implemented in many other ways. For example, the processes may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
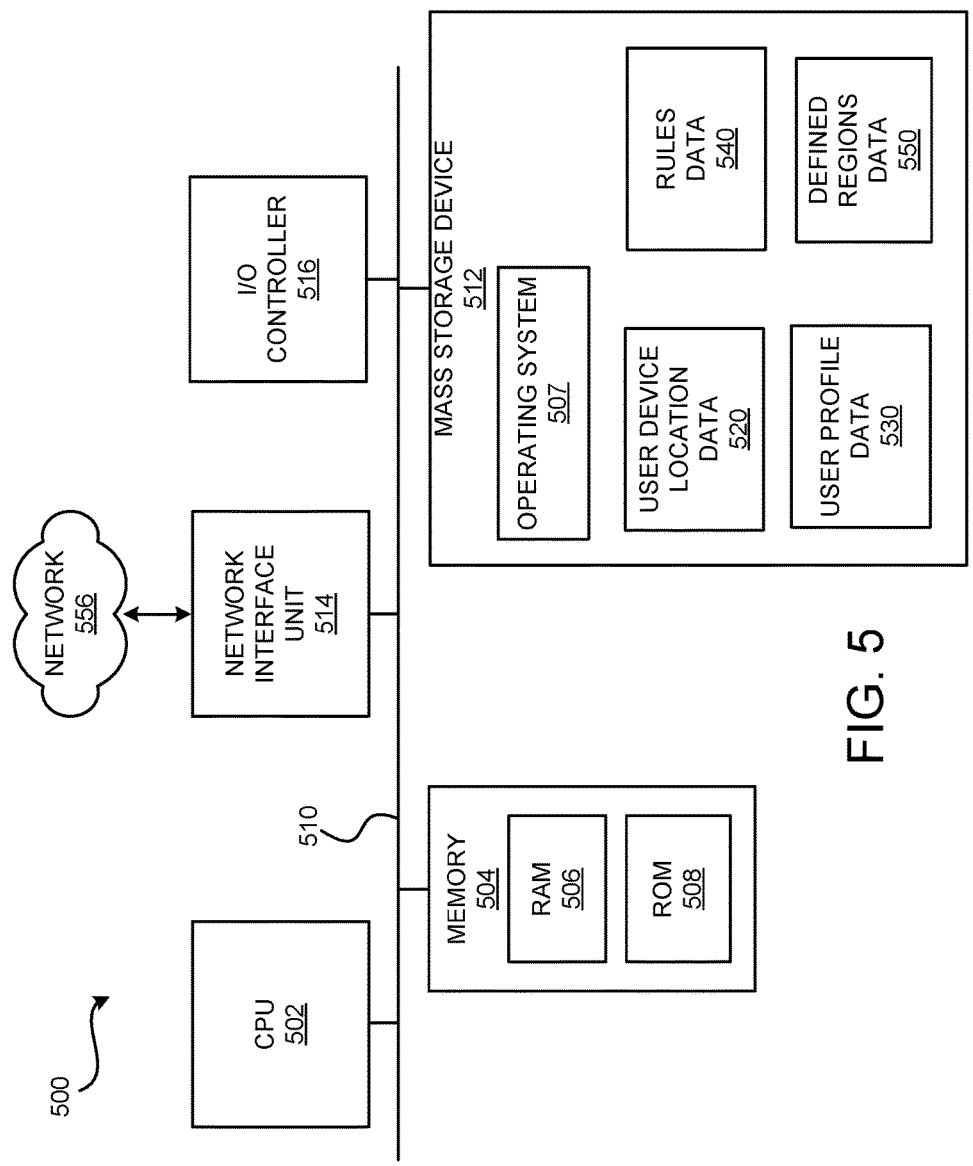
FIG. 5 is a computer architecture diagram illustrating an computer hardware and software architecture for a computing system capable of implementing aspects of the techniques and technologies presented herein.

FIG. 5 shows additional details of an example computer architecture 500 for a computer, such as the UCDs 104 or the messaging service 120 in FIGS. 1A-C, capable of executing the program components described herein. Thus, the computer architecture 500 illustrated in FIG. 5 illustrates an architecture for a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data, such as user device location data 520, user profile data 530, rules data 540, geographical regions data 550, and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for location drive group communications. Thus, the distributed computing environment 600 illustrated in FIG. 6 can be utilized to execute any aspects of the software components presented herein. For example, the distributed computing environment 600 can be utilized to execute aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include user input devices, such as game controllers and television remotes. It should be understood that any number of devices 606 can communicate with the computing environment 602. Two example computing architectures for the devices 606 are illustrated and described herein with reference to FIGS. 5 and 6. It should be understood that the illustrated devices 606 and computing architectures illustrated and described herein are illustrative only, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for adapting input action assignments for input controls of an input device. It should be understood that this configuration is illustrative only, and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash.

Other services are possible and are contemplated.

The social networking services 622 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above configurations are illustrative, and should not be construed as being limited in any way. According to various implementations, the social networking services 622 may host one or more applications and/or software modules for providing the functionality described herein for adapting input action assignments for input controls of an input device. For instance, any one of the application servers 608 may communicate or facilitate the functionality and features described herein. For instance, a social networking application, mail client, messaging client or a browser running on a mobile telephone or any other client 606 may communicate with a networking service 622 and facilitate the functionality, even in part, described above with respect to FIG. 6.

As shown in FIG. 6, the application servers 608 also can host other services, applications, portals, and/or other resources ("other resources") 624. The other resources 624 can include, but are not limited to, document sharing, rendering, or any other functionality. It thus can be appreciated that the computing environment 602 can provide integration of the technologies disclosed herein with various mailbox, messaging, social networking, and/or other services or resources.

As mentioned above, the computing environment 602 can include data storage 610. According to various implementations, the functionality of the data storage 610 is provided by one or more data stores operating on, or in communication with, the network 604. The functionality of the data storage 610 also can be provided by one or more server computers configured to host data for the computing environment 602. The data storage 610 can include, host, or provide one or more real or virtual data stores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of technologies disclosed herein, the distributed computing environment 600 provides the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the technologies disclosed herein enable any device configured to access the distributed computing environment 600 to utilize the functionality described herein for adapting input action assignments for input controls of an input device, among other aspects.

Figure 7:
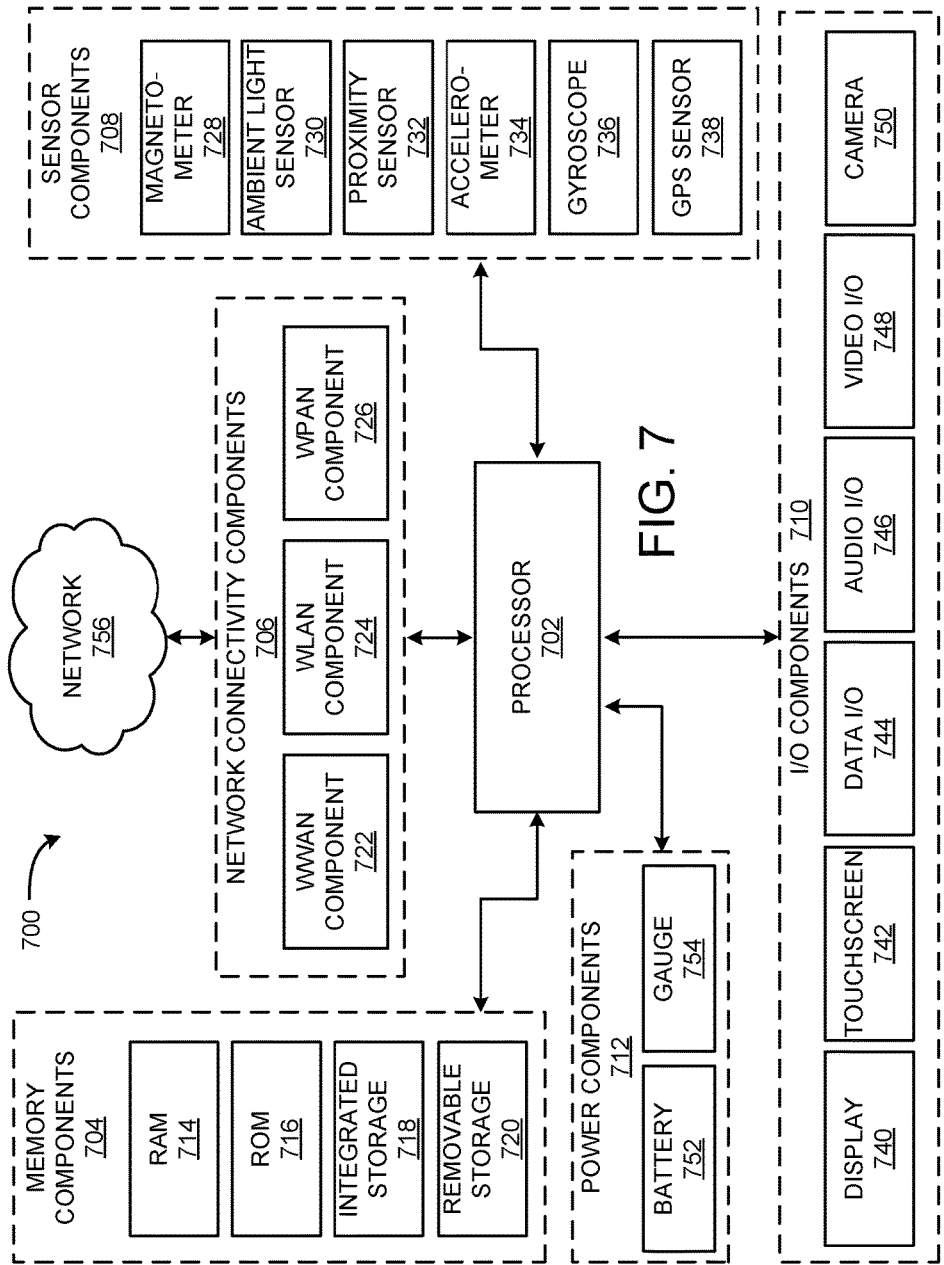
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for adapting input action assignments for input controls of an input device. The computing device architecture 700 is applicable to computing devices that facilitate mobile computing due, in part, to form factor, wireless connectivity, and/or battery-powered operation. In some configurations, the computing devices include, but are not limited to, mobile telephones, on-board computers, tablet devices, slate devices, portable video game devices, and the like.

The computing device architecture 700 is applicable to the messaging service 120 and UCDs 104 shown in FIGURES 1A-C and any of the clients 606 shown in FIG. 6. Moreover, aspects of the computing device architecture 700 may be applicable to traditional desktop computers, portable computers (e.g., laptops, notebooks, ultra-portables, and netbooks), server computers, game consoles, and other computer systems, such as described herein with reference to FIG. 6. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 920P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 556 of FIG. 5. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 1002.11 standards, such as IEEE 1002.11a, 1002.11b, 1002.11g, 1002.11n, and/or future 1002.11 standard (referred to herein collectively as WI-FI). Draft 1002.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The magnetometer 728 is configured to measure the strength and direction of a magnetic field. In some configurations the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some configurations, the ambient light sensor 730 provides measurements to an application program stored within one of the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some configurations, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some configurations, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some configurations, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some configurations, output from the gyroscope 736 is used by an application program as an input mechanism to control some functionality of the application program. For example, the gyroscope 736 can be used for accurate recognition of movement within a 3D environment of a video game application or some other application. In some configurations, an application program utilizes output from the gyroscope 736 and the accelerometer 734 to enhance control of some functionality of the application program. In still other configurations, an application program utilizes output from the gyroscope 736 and the accelerometer 734 for game control. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 740 is a liquid crystal display ("LCD") utilizing any active or passive matrix technology and any backlighting technology (if used). In some configurations, the display 740 is an organic light emitting diode ("OLED") display. Other display types are contemplated.

The touchscreen 742, also referred to herein as a "touch-enabled screen," is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 742 is incorporated on top of the display 740 as a transparent layer to enable a user to use one or more touches to interact with objects or other information presented on the display 740. In other configurations, the touchscreen 742 is a touch pad incorporated on a surface of the computing device that does not include the display 740. For example, the computing device may have a touchscreen incorporated on top of the display 740 and a touch pad on a surface opposite the display 740.

In some configurations, the touchscreen 742 is a single-touch touchscreen. In other configurations, the touchscreen 742 is a multi-touch touchscreen. In some configurations, the touchscreen 742 is configured to detect discrete touches, single touch gestures, and/or multi-touch gestures. These are collectively referred to herein as gestures for convenience. Several gestures will now be described. It should be understood that these gestures are illustrative only and are not intended to limit the scope of the appended claims. Moreover, the described gestures, additional gestures, and/or alternative gestures may be implemented in software for use with the touchscreen 742. As such, a developer may create gestures that are specific to a particular application program.

In some configurations, the touchscreen 742 supports a tap gesture in which a user taps the touchscreen 742 once on an item presented on the display 740. The tap gesture may be used for various reasons including, but not limited to, opening or launching whatever the user taps. In some configurations, the touchscreen 742 supports a double tap gesture in which a user taps the touchscreen 742 twice on an item presented on the display 740. The double tap gesture may be used for various reasons including, but not limited to, zooming in or zooming out in stages. In some configurations, the touchscreen 742 supports a tap and hold gesture in which a user taps the touchscreen 742 and maintains contact for at least a pre-defined time. The tap and hold gesture may be used for various reasons including, but not limited to, opening a context-specific menu.

In some configurations, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In some configurations, the touchscreen 742 supports a flick gesture in which a user swipes a finger in the direction the user wants the screen to move. The flick gesture may be used for various reasons including, but not limited to, scrolling horizontally or vertically through menus or pages. In some configurations, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 742. As such, the above gestures should be understood as being illustrative only and should not be construed as being limiting in any way.

The data I/O interface component 744 is configured to facilitate input of data to the computing device and output of data from the computing device. In some configurations, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 746 is configured to provide audio input and/or output capabilities to the computing device. In some configurations, the audio I/O interface component 746 includes a microphone configured to collect audio signals. In some configurations, the audio I/O interface component 746 includes a headphone jack configured to provide connectivity for headphones or other external speakers. In some configurations, the audio I/O interface component 746 includes a speaker for the output of audio signals. In some configurations, the audio I/O interface component 746 includes an optical audio cable out.

The video I/O interface component 748 is configured to provide video input and/or output capabilities to the computing device. In some configurations, the video I/O interface component 748 includes a video connector configured to receive video as input from another device (e.g., a video media player such as a DVD or BLURAY player) or send video as output to another device (e.g., a monitor, a television, or some other external display). In some configurations, the video I/O interface component 748 includes a High-Definition Multimedia Interface ("HDMI"), mini-HDMI, micro-HDMI, DisplayPort, or proprietary connector to input/output video content. In some configurations, the video I/O interface component 748 or portions thereof is combined with the audio I/O interface component 746 or portions thereof.

The camera 750 can be configured to capture still images and/or video. The camera 750 may utilize a charge coupled device ("CCD") or a complementary metal oxide semiconductor ("CMOS") image sensor to capture images. In some configurations, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspects of the computing device. The hardware buttons may be dedicated buttons or multi-use buttons. The hardware buttons may be mechanical or sensor-based.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 can be configured to measure battery parameters such as current, voltage, and temperature. In some configurations, the battery gauge 754 is configured to measure the effect of a battery's discharge rate, temperature, age and other factors to predict remaining life within a certain percentage of error. In some configurations, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure encompasses the subject matter set forth in the following examples:

Example 1

A system for generating geographically-driven group communications, the system comprising: a processor in communication with a first data store (110) storing location information for a plurality of user client devices corresponding to users, a second data store (112) storing user profile data defining one or more user characteristics for the users of the plurality of user client devices, a third data store (124) storing data defining one or more geographical regions, a fourth data store (122) storing a plurality of rules, wherein individual ones of the plurality of rules identify at least one of the one or more geographical regions to which the rule applies, identifies at least one group characteristic, and defines a communication and a payload to be sent when a group of users having the group characteristic are located within the geographical region and a memory in communication with the processor, the memory having computer-readable instructions stored thereupon that, when executed by the processor, cause the processor to: detect (210) an update event in one of the first data store, the second data store, the third data store, or the fourth data store; and responsive to detecting the update event, for at least a first rule of the plurality of rules in the fourth data store: using the user location data from the first store, the user profile data from the second store, and the geographical region identified by the first rule from the third data store, determine (220) whether a group of multiple user client devices are located in the geographical region identified by the first rule and have users with a user characteristic that matches the group characteristic identified by the first rule, and send (222) the communication and payload defined by the first rule to the group of multiple user client devices.

Example 2

The system of Example 1, wherein the update event comprises one or more of a change in the first data store of the location of one of the plurality of user client devices, a change in the second store of one of the user characteristics for the users of the plurality of user client devices, a change in the third data store for the definition of one of the geographical regions, a change in the fourth store of one of the plurality of rules, an addition in the fourth store of a new rule to the plurality of rules, a time duration, or a time of day.

Example 3

The system of any of the above Examples, wherein the communication of the rule comprises at least one of a text message, a voice message, a Short Message Service (SMS) message, an email message, or a push notification.

Example 4

The system of any of the above Examples, wherein the payload of at least one of the plurality of rules comprises at least one of text data, image data, audio data, haptic data, a Universal Resource Locator (URL), or verified document data.

Example 5

The system of any of the above Examples, wherein the payload of at least one of the plurality of rules comprises one or more of pre-determined content and algorithmically determined content.

Example 6

The system of any of the above Examples, wherein the geographical regions comprise at least one of a real-world region or a virtual region.

Example 7

The system of any of the above Examples, wherein at least one of the plurality of rules defines a threshold number of user client devices within the geographical region for the one rule; and when a number of user client devices within the geographical region meets the threshold number defined by the one rule, the communication and payload are sent to the user client devices within the geographical region for the one rule.

Example 8

The system of any of the above Examples, wherein at least one of the plurality of rules defines a list of users; and when the user client device for each of the list of users is located within the geographical region for the one rule, the communication and payload are sent to the user client devices of the list of users.

Example 10

A system for generating geographically-driven group communications, the system comprising: a processor in communication with a first data store (110) storing location information for a plurality of user client devices corresponding to users, a second data store (124) storing data defining one or more geographical regions, a third data store (122) storing a plurality of rules, wherein one rule of the plurality of rules identifies a geographical region to which the rule applies, identifies a trigger event relating to the geographical region, and defines a communication and a payload; and a memory in communication with the processor, the memory having computer-readable instructions stored thereupon that, when executed by the processor, cause the processor to: detect (210) an update event in the first data store (110); and if the update event matches the trigger event for the one rule, send (230) the communication and payload defined by the one rule to a group of user client devices.

Example 11

The system of Example 10, wherein the trigger event corresponds to at least one of a user client device entering the geographical region, a user client device exiting the geographical region, a number of user client devices that have entered the geographical region, a number of user client devices that have exited the geographical region, and a number of user client devices that are currently located in the geographical region.

Example 12

The system of any of the above Examples, wherein the group of user client devices to be sent the communication comprises one or more of user client devices for a list of users, user client devices that have entered the geographical region, user client devices that have exited the geographical region, and user client devices that are currently located in the geographical region.

Example 13

The system of any of the above Examples, wherein the one rule of the plurality of rules further identifies a group characteristic; the processor is in communication with a fourth data store (112) storing user profile data defining one or more user characteristics for the users of the plurality of user client devices; and the trigger event comprises one or more of a user client device for a user having a user characteristic matching the group characteristic exiting the geographical region, a user client device for a user having a user characteristic matching the group characteristic entering the geographical region, a number of user client devices with a user having a user characteristic matching the group characteristic that have entered the geographical region, a number of user client devices with a user having a user characteristic matching the group characteristic that have exited the geographical region, a number of user client devices with a user having a user characteristic matching the group characteristic that are currently located in the geographical region.

Example 14

The system of any of the above Examples, wherein the group of user client devices to be sent the communication is defined by the one rule and comprises one or more of user client devices for a list of users, user client devices with a user having a user characteristic matching the group characteristic, user client devices with a user having a user characteristic matching the group characteristic that have entered the geographical region, user client devices with a user having a user characteristic matching the group characteristic that have exited the geographical region, user client devices with a user having a user characteristic matching the group characteristic that are currently located in the geographical region.

Example 15

The system of any of the above Examples, wherein the group characteristic includes a user characteristic relating to at least one of lists of users, user demographic data, user historical data, user preference data, user location data, and user group identification data.

Example 16

The system of any of the above Examples, wherein each geographical region comprises at least one of a real-world location or a virtual location.

Example 17

The system of any of the above Examples, wherein the communication comprises at least one of a text message, a voice message, a Short Message Service (SMS) message, an email message, or a push notification; the payload comprises at least one of text data, image data, audio data, haptic data, a Universal Resource Locator (URL), or verified document data; or at least one of the set of rules algorithmically defines a payload for the rule.

What is claimed is:

1. A system for generating geographically-driven group communications, the system comprising:
   a processor in communication with
      a first data store storing location information for a plurality of user client devices corresponding to users,
      a second data store storing user profile data defining one or more user characteristics for the users of the plurality of user client devices,
      a third data store storing data defining one or more geographical regions,
      a fourth data store storing a plurality of rules, wherein an individual rule of the plurality of rules identifies a geographical region to which the individual rule applies, the individual rule identifies at least one group characteristic and defines a payload to be sent when a group of users having the group characteristic are located within the geographical region; and
   a memory in communication with the processor, the memory having computer-readable instructions stored thereupon that, when executed by the processor, cause the processor to:
      detect an update event in at least one of the first data store, the second data store, the third data store, or the fourth data store; and
      responsive to detecting the update event,
         using the user location data from the first store, the user profile data from the second store, and the geographical region identified by the third data store, determine if a group of user client devices have entered in the geographical region identified by the individual rule and have users associated with a user characteristic that matches the group characteristic identified by the individual rule, and
         in response to determining if the group of user client devices have entered the geographical region and have users associated with the user characteristic that matches the group characteristic identified by the individual rule, sending the payload defined by the individual rule to the group of user client devices.

2. The system of claim 1, wherein the update event comprises one or more of a change in the first data store of the location of one of the group of user client devices, a change in the second store of one of the user characteristics for the users of the group of user client devices, a change in the third data store for the definition of one of the geographical regions, a change in the fourth store of one of the plurality of rules, an addition in the fourth store of a new rule to the plurality of rules, a time duration, or a time of day.

3. The system of claim 1, wherein the payload comprises at least one of a text message, a voice message, a Short Message Service (SMS) message, an email message, or a push notification.

4. The system of claim 1, wherein the payload of at least one of the plurality of rules comprises at least one of text data, image data, audio data, haptic data, a Universal Resource Locator (URL), or verified document data.

5. The system of claim 1, wherein the payload of at least one of the plurality of rules comprises one or more of pre-determined content and algorithmically determined content.

6. The system of claim 1, wherein the geographical regions comprise at least one of a real-world region or a virtual region.

7. The system of claim 1, wherein:
   at least one of the plurality of rules defines a threshold number of user client devices within the geographical region for the one rule; and
   when a number of user client devices within the geographical region meets the threshold number, send the payload to the user client devices within the geographical region.

8. The system of claim 1, wherein:
   at least one of the plurality of rules defines a list of users; and
   wherein sending the payload is in response to determining that the user client device for each user of the list of users is located within the geographical region.

9. A computer-implemented method for generating geographically-driven group communications, the system comprising:

accessing at least one data store storing location information for a plurality of user client devices corresponding to users, user profile data defining one or more user characteristics for the users of the plurality of user client devices, data defining one or more geographical regions, a plurality of rules, wherein individual ones of the plurality of rules identifies at least one of the one or more geographical regions to which the rule applies, identifies at least one group characteristic, and defines a payload to be sent when a group of users having the group characteristic are located within the geographical region;

detecting an update event in the at least one data store; and responsive to detecting the update event, for at least a first rule of the plurality of rules in the at least one data store:

using the user location data from the at least one data store, the user profile data from the at least one data store, and the geographical region to determine if a group of user client devices have entered the geographical region and have users with a user characteristic that matches the group characteristic, and in response to determining if the group of user client devices have entered the geographical region and have users associated with the user characteristic that matches the group characteristic identified by the individual rule, sending the payload to the group of multiple user client devices.

10. The method of claim 9, wherein the payload comprises at least one of a text message, a voice message, a Short Message Service (SMS) message, an email message, a push notification, or at least one of the set of rules algorithmically defines a payload for the rule.

11. The method of claim 9, wherein:

at least one of the set of rules defines a threshold number of user client devices within the geographical region; and when a number of user client devices within the geographical region meets the threshold number, the payload are sent to the user client devices within the geographical region.

12. The method of claim 9, wherein:

at least one of the plurality of rules defines a list of users; and when the user client device for each of the users in the list of users is located within the geographical region, the payload are sent to the user client devices of the list of users.

13. A system for generating geographically-driven group communications, the system comprising:

a processor in communication with at least one data store storing location information for a group user client devices, wherein individual user client devices are associated with a group characteristic, data defining one or more geographical regions, a plurality of rules, wherein one rule of the plurality of rules identifies a geographical region to which the rule applies, identifies a trigger event relating to the geographical region, and defines a payload; and a memory in communication with the processor, the memory having computer-readable instructions stored thereupon that, when executed by the processor, cause the processor to:

detect an update event in the at least one data store; and if the update event matches the trigger event for the one rule, and if each user client device of the group of user client devices has entered the geographical region, send the payload defined by the one rule to the group of user client devices.

14. The system of claim 13, wherein the trigger event corresponds to at least one of a user client device entering the geographical region, a user client device exiting the geographical region, a number of user client devices that have entered the geographical region, a number of user client devices that have exited the geographical region, and a number of user client devices that are currently located in the geographical region.

15. The system of claim 14, wherein the payload is sent to at least one of user client devices on a list, user client devices that have entered the geographical region, or user client devices that have exited the geographical region.

16. The system of claim 13, wherein the trigger event comprises one or more of a user client device for a user having a user characteristic matching the group characteristic exiting the geographical region, a user client device for a user having a user characteristic matching the group characteristic entering the geographical region, a number of user client devices with a user having a user characteristic matching the group characteristic that have entered the geographical region, a number of user client devices with a user having a user characteristic matching the group characteristic that have exited the geographical region, a number of user client devices with a user having a user characteristic matching the group characteristic that are currently located in the geographical region.

17. The system of claim 16, wherein the payload is sent to the group of user client devices that are defined by the one rule and comprises one or more of user client devices for a list of users, user client devices with a user having a user characteristic matching the group characteristic, user client devices with a user having a user characteristic matching the group characteristic that have entered the geographical region, user client devices with a user having a user characteristic matching the group characteristic that have exited the geographical region, user client devices with a user having a user characteristic matching the group characteristic that are currently located in the geographical region.

18. The system of claim 17, where the group characteristic includes a user characteristic relating to at least one of lists of users, user demographic data, user historical data, user preference data, user location data, and user group identification data.

19. The system of claim 13, wherein each geographical region comprises at least one of a real-world location or a virtual location.

20. The system of claim 13, wherein the payload comprises at least one of text data, image data, audio data, haptic data, a Universal Resource Locator (URL), or verified document data; or at least one of the set of rules algorithmically defines a payload for the rule.

* * * * *